May 27, 1958  R. E. BAUER  2,836,642
DRY BATTERY ASSEMBLY
Filed Oct. 22, 1956  2 Sheets-Sheet 1
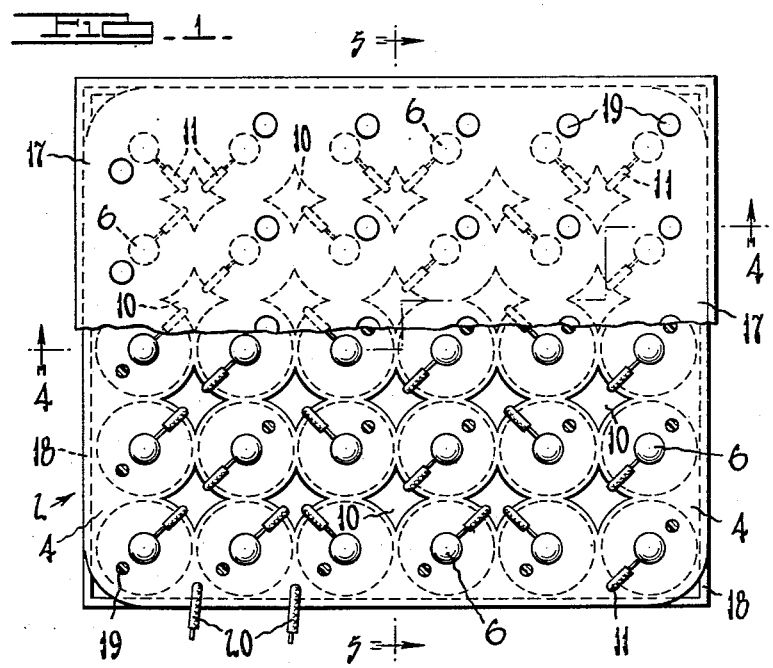
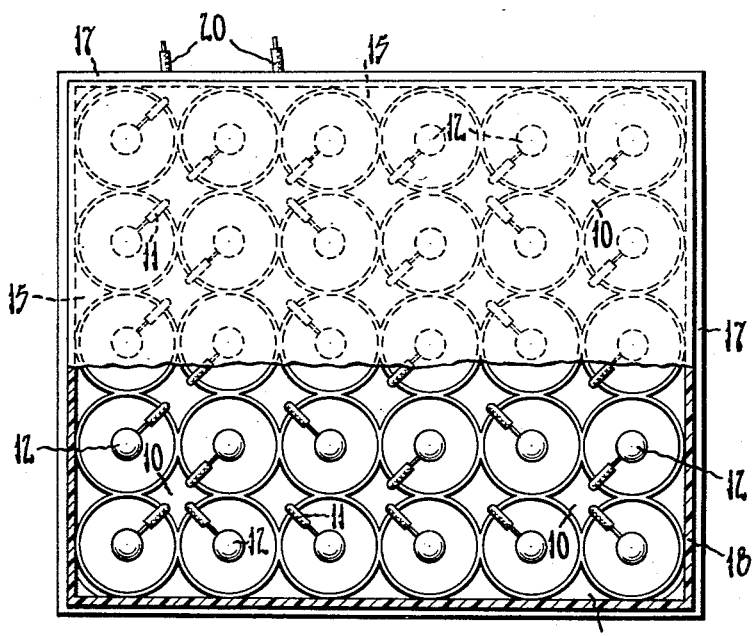
INVENTOR
R. E. BAUER
BY *Wendenoth, Lind & Ponack*
Attys.

May 27, 1958     R. E. BAUER     2,836,642
DRY BATTERY ASSEMBLY
Filed Oct. 22, 1956     2 Sheets-Sheet 2
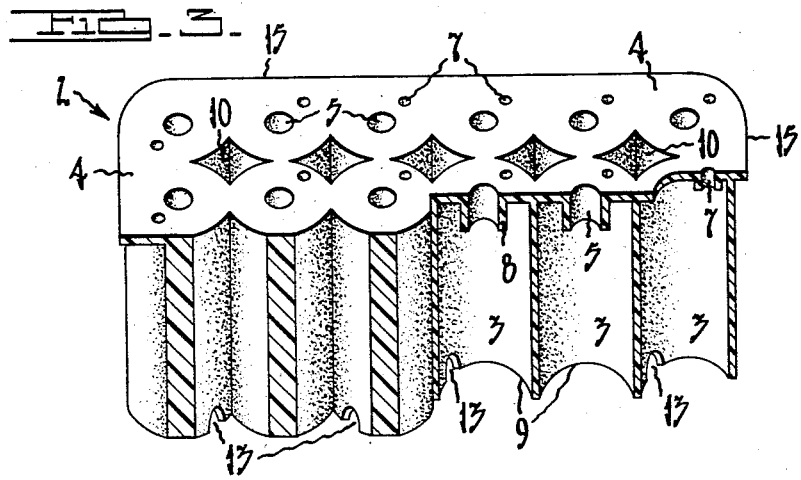
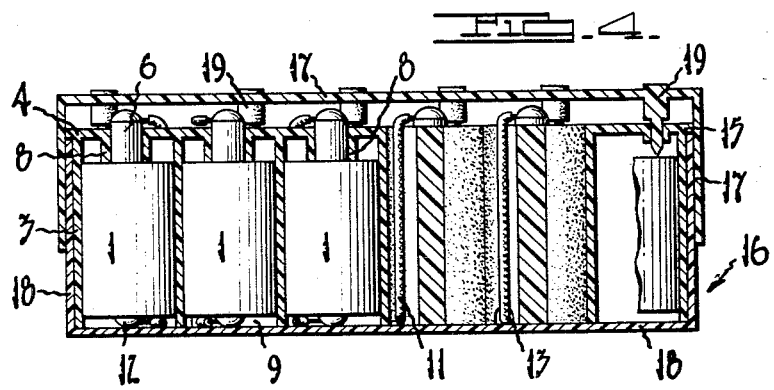
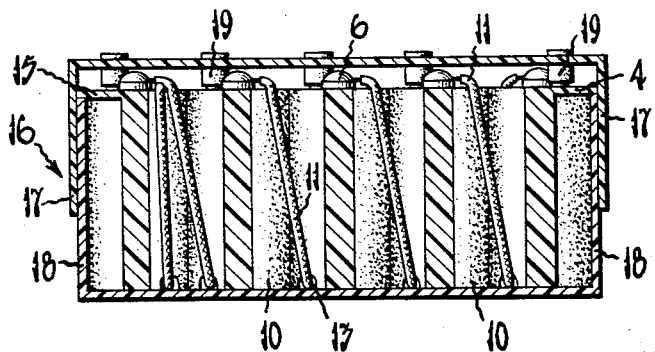
INVENTOR
R. E. BAUER

United States Patent Office 2,836,642
Patented May 27, 1958

2,836,642

DRY BATTERY ASSEMBLY

Rudolf Erich Bauer, Hawthorn, Victoria, Australia

Application October 22, 1956, Serial No. 617,575

6 Claims. (Cl. 136—90)

This invention relates to improvements in dry batteries, and refers especially to multicell dry batteries of the "inert" type, that is, dry batteries which require to be activated by the introduction of water or electrolyte into the cells before placing the battery in use. The invention also relates to an improved method of assembling cells into a battery and provides improved intercell insulation in the assembled battery. The method of this invention can also be used with advantage for the assembly of the cells of conventional dry batteries if prevention of self discharge and long shelf life are aimed at, and is particularly suitable where the battery is to be used under humid tropical conditions.

For the simultaneous activation of a large number of inert dry cells, of which one battery normally consists, a vacuum method is used. According to this method of activation of inert dry batteries, the battery is placed in an activation chamber, in which it is immersed in water, the air pressure in the chamber is reduced to a predetermined extent, and by restoration of the atmospheric pressure, the required quantity of water is forced into the cells of the battery through arteries or passages in said cells.

It has been found that, using the vacuum method of activation, existing battery assemblies have had the disadvantage that, during activation of the battery, water will be caused to enter any cavities or voids existing in the intercell insulation, and which communicate with the outside of the battery, or which are capable of penetration by water under pressure. Such water, in conjunction with any chemicals deposited on the outside surfaces of the zinc cans during manufacture, forms an electrolyte which will discharge parts of the battery, and which may cause other damage thereto.

It is an object of this invention to provide an improved inert dry battery which is capable of activation by the abovementioned vacuum method, which is reliable in service and which is not subject to the abovementioned disadvantages.

According to the invention, the abovementioned object is accomplished by constructing a dry battery assembly comprising a web of elastic insulating material, a series of containers formed in the said web, a series of individual cells inserted in the containers and having a frictional fit therein, each cell having a control electrode, the internal cross-section of each container in its unstretched condition being slightly smaller than the external cross-section of the cell to be inserted in it, and each container having one closed end for seating one end of the respective cell and one open end through which the cell is inserted in the container, and an opening in the closed end of the container to accommodate the central electrode of the respective cell.

The containers are preferably arranged with their axes perpendicular to the plane of the web, and the web is preferably of such thickness as to enable the containers to be slightly longer than the cells.

In addition to the containers for accommodation of the cells, other cavities may be provided in the web to facilitate passage of conductors connecting the opposite ends of various cells. In the following description and in the appended claims the cavities for accommodation of cells will be referred to as containers, while those for passage of conductors will be referred to as passages.

The containers may be of the same shape as the cells, and of approximately the same size, so that each container receives one cell of the battery. The web is made of elastic insulating material, and the internal cross-section of each container is made slightly smaller than the external cross-section of the respective cell, so that the latter fits tightly into the respective container. This has the twofold advantage that the frictional fit of cell and container eliminates the necessity of using adhesives to hold the cells in place, and also an outright seal is made around the body of each cell.

Each container has one closed end for closing the upper end of the respective cell, and one open end for insertion of the cell. The closed end of the container, in conjunction with the outright seal around the body of the cell mentioned above, together form a seal for the top of the cell, thus eliminating the necessity for the usual bituminous seal provided at the top of cells.

An integral sleeve is preferably provided in the closed end of each container for passage of the central carbon electrode of the respective cell, and also a small activation hole or passage may be provided in said closed end to allow access of water or electrolyte to the interior of the cell during activation.

In a preferred form of the invention a case is provided to enclose the web, and a cover is provided which is fitted with means for sealing the activation holes when the same are not in use.

In the following description of a preferred form of the invention, reference is made to the accompanying drawings, in which:

Fig. 1 shows a plan view of the top of a battery and case made in accordance with the invention, in which half of the lid of the case has been cut away.

Fig. 2 shows an inverse plan view of the battery and case shown in Fig. 1.

Fig. 3 is a sectional view of a web according to the invention.

Fig. 4 is a sectional view taken along line 4—4 of Fig. 1.

Fig. 5 is a sectional view taken along line 5—5 of Fig. 1.

Referring to the drawings, the cells 1 of the battery are supported in a web 2 of insulating material comprising a number of containers 3 arranged in a regular array. The containers 3 are of the same shape as the cells 1, and of slightly smaller cross-section so that there will be a tight interference fit between the cell 1 and its container 3. For this reason the web may be made of polyvinyl chloride or another insulating material having a degree of elasticity.

Each container 3 is provided integrally at one end with a flat disc 4 containing a central hole 5 through which the central electrode 6 of the cell may pass, and another, smaller, off centre, activation hole 7. The central electrode hole 5 is provided with a sleeve 8 extending down a short distance into the container. This electrode sleeve 8 is of the same shape as the electrode 6, and of slightly smaller cross-section, so that there will be a tight interference fit between them. The containers 3 are open at the opposite end 9 to the disc 4 for insertion of the cells 1, and they are slightly longer than the cells 1.

The gaps between each four containers in the web form a number of open-ended passages 10 extending the full length of the containers and parallel to them. These passages 10 provide a convenient route for the electrical connecting wires 11 to lead from the central electrodes 6 at one end of the containers 3, to the base 12 of the next cell exposed by the open end of its container 3. A small slot or recess 13 is formed in the wall of each container 3 at the open end 9 thereof between the container 3 and the appropriate passage 10 through which the connecting wire 11 to that cell passes. This slot or recess 13 accommodates the said connecting wire 11 and thus ensures that said wire 11 does not project below the lower end of the container 3.

An airtight seal is formed for the upper end of each cell 1 in its container 3, by means of the interference fit of the container 3 around the sides of the cell 1 and the similar fit of the electrode sleeve 8 on the electrode 6. The activation hole 7 is thus the only means of access of air and water to the interior of the cell 1. Owing to the nature of the assembly, the formation of leakage paths by water picked up during the activation process is avoided. Since the containers 3 are longer than the cells 1, whereby the insulating walls thereof projecting downwardly for a distance beyond the cell bases, the formation of leakage paths between the adjacent exposed cell bases is substantially prevented.

In the assembly of the batteries the web 2 is stretched on a jig (not shown) to an extended size so that the cells can fit easily into the containers 3. The jig is provided with pins to enlarge the electrode sleeve 8 to a size larger than the electrode 6 so that the latter may fit easily into its sleeve 8. Means are provided for retracting the pins as the cells 1 are pushed home, thus allowing the sleeves 8 to contract tightly around the electrodes 6.

As the cells 1 are pulsed into their containers 3 there may be a tendency for the web 2 to buckle under the force necessary to push the cells home. This tendency is greatest in the case of the containers at the sides of the web 15, since they are not supported by other containers all around them. To overcome this difficulty compressed air is applied to the interior of the containers 3 through the activation holes 7, so as to impart sufficient rigidity or strength to the containers 3 to enable them to withstand without buckling or deformation, the action of introducing the cells 1 into said containers 3.

The battery, during storage in the inert and activated condition, is held in a case 16, which besides being a convenient container, is constructed so as to seal the activation holes when the battery is in the activated condition and thus prevents loss of electrolyte. The case may be made of plastic or other suitable material, and may comprise an upper part 17 and a lower part 18 which fit within one another.

The upper part of the case 17 is provided on its inner surface with a number of teats 19, positioned so that when the case is closed the teats 19 fit into and seal the activation holes 7 in the upper end of the battery.

When the battery is packed for storage in the inert condition, a sheet of some cheap material (not shown) is inserted in that part of the case fitted with the teats 19, of a thickness identical with the length of the teats 19 and with holes arranged so that the sheet of material slips over the teats 19, to prevent the teats 19 from entering the activation holes 7 and to protect them from damage during storage. The sheet of material is removed before replacing the battery in the case after activation.

To effect activation, the battery is removed from the case and immersed in the activation chamber, water then having free access to the interiors of the cells through the activation holes 7. After activation the battery is fitted in the case so that the activation holes 7 are closed and sealed by the teats 19, and the leads 20 to the battery are passed through holes in the case.

The batteries are kept during storage in the inert condition in an airtight container from which they are removed prior to activation.

I claim:

1. A dry battery assembly comprising a web of elastic insulating material, a series of containers formed in the said web, a series of individual cells inserted in the containers and having a frictional fit therein, each cell having a central electrode the internal cross-section of each container in its unstretched condition being slightly smaller than the external cross-section of the cell to be inserted in it, and each container having one closed end for seating one end of the respective cell and one open end through which the cell is inserted in the container, the closed end of each container having an opening therein to accommodate said central electrode.

2. A dry battery assembly according to claim 1 and having an integral open-ended sleeve in the closed end of each container through which the central electrode of the respective cell projects, the said sleeve frictionally engaging the electrode and the internal cross-section of each sleeve in its unstretched condition being slightly smaller than the external cross-section of the respective electrode.

3. A dry battery assembly according to claim 1 and having an integral open-ended sleeve in the closed end of each container through which the central electrode of the respective cell projects, the said sleeve frictionally engaging the electrode and the internal cross-section of each sleeve in its unstretched condition being slightly smaller than the external cross-section of the respective electrode, the closed ends of the containers, having filling passages therein through which water or electrolyte may be introduced into the cells, and means for closing the said filling passages when not in use.

4. A dry battery assembly according to claim 1 and having an integral open-ended sleeve in the closed end of each container through which the central electrode of the respective cell projects, the said sleeve frictionally engaging the electrode and the internal cross-section of each sleeve in its unstretched condition being slightly smaller than the external cross-section of the respective electrode, the closed ends of the containers having filling passages therein through which water or electrolyte may be introduced into the cells, a case in which the assembly is fitted, a cover attached to the case, and a series of plugs mounted on the cover, the inner ends of which enter and close the said filling passages when the same are not in use.

5. A dry battery assembly according to claim 1 and having an integral open-ended sleeve in the closed end of each container through which the central electrode of the respective cell projects, the said sleeve frictionally engaging the electrode and the internal cross-section of each sleeve in its unstretched condition being slightly smaller than the external cross-section of the respective electrode, the closed ends of the containers having filling passages therein through which water or electrolyte may be introduced into the cells, a case in which the assembly is fitted, a cover attached to the case, a series of plugs mounted on the cover the inner ends of which enter and close the said passages when the same are not in use, and said web having an open-ended passage formed therein between each four adjacent containers, the connecting wires between the cells being passed through the said open-ended passages.

6. A dry battery assembly according to claim 1 and having an integral open ended sleeve in the closed end of each container through which the electrode of the respective cell projects, the said sleeve frictionally engaging the electrode and the internal cross-section of each sleeve in its unstretched condition being slightly smaller than the external cross-section of the respective electrode, the closed ends of the containers having filling passages therein through which water or electrolyte may be introduced into the cells, a case in which the assembly is fitted, a cover attached to the case, and a series of plugs mounted on the cover the inner ends of which enter and close the said passages, each container being longer than the respective cell, said web having an open-ended passage formed therein between each four adjacent containers, the connecting wires between the cells extending through said open-ended passages, and each container having a recess herein adjacent the open end thereof, each connecting wire being passed from its cell through said recess to an adjacent open-ended passage.

References Cited in the file of this patent

UNITED STATES PATENTS

| | | |
|---|---|---|
| 1,641,685 | Meisekothen | Sept. 6, 1927 |
| 2,349,763 | Setzer | May 23, 1944 |

FOREIGN PATENTS

| | | |
|---|---|---|
| 288,597 | Great Britain | Sept. 6, 1928 |